(12) United States Patent
Chan

(10) Patent No.: US 7,181,758 B1
(45) Date of Patent: Feb. 20, 2007

(54) INFORMATION DISTRIBUTION AND PROCESSING SYSTEM

(75) Inventor: Hark C. Chan, Cupertino, CA (US)

(73) Assignee: Data Innovation, L.L.C., Northbrook, IL (US)

(*) Notice: Subject to any disclaimer, the term of this patent is extended or adjusted under 35 U.S.C. 154(b) by 245 days.

(21) Appl. No.: 10/322,624

(22) Filed: Dec. 19, 2002

Related U.S. Application Data

(63) Continuation of application No. 10/079,257, filed on Feb. 19, 2002, now abandoned, which is a continuation of application No. 09/699,022, filed on Oct. 27, 2000, now abandoned, which is a continuation of application No. 09/480,226, filed on Jan. 10, 2000, now Pat. No. 6,347,215, which is a continuation of application No. 08/939,368, filed on Sep. 29, 1997, now Pat. No. 6,021,307, which is a continuation-in-part of application No. 08/644,838, filed on May 10, 1996, now abandoned, which is a continuation-in-part of application No. 08/279,424, filed on Jul. 25, 1994, now abandoned.

(51) Int. Cl.
H04N 7/173 (2006.01)

(52) U.S. Cl. ..................... 725/110

(58) Field of Classification Search ........... 725/110, 725/105, 66, 109; 455/3.1, 150.1; 709/219; 713/193, 189
See application file for complete search history.

(56) References Cited

U.S. PATENT DOCUMENTS

| | | |
|---|---|---|
| 3,824,597 A | 7/1974 | Berg |
| 3,967,202 A | 6/1976 | Batz |
| 4,054,911 A | 10/1977 | Fletcher et al. |
| 4,081,832 A | 3/1978 | Sherman |
| 4,191,860 A | 3/1980 | Weber |
| 4,215,406 A | 7/1980 | Gomola et al. |
| 4,307,416 A | 12/1981 | Spano |
| 4,430,639 A | 2/1984 | Bennett |

(Continued)

FOREIGN PATENT DOCUMENTS

WO 93/09631 5/1993

OTHER PUBLICATIONS

"Library for Psychiatrists; American Psychiatric Press Inc.'s CD-ROM Library"; Information Today; vol. 10; No. 6; p. 30; Jun. 1993.

(Continued)

Primary Examiner—William D. Cumming
(74) Attorney, Agent, or Firm—Martin & Ferraro, LLP

(57) ABSTRACT

An information distribution and processing system contains a sender and a plurality of processing units. The sender delivers a set of digital data, without receiving a request signal, to the plurality of processor units. The set of digital data contains a first set of displayable data, a second set of displayable data, at least one non-displayable symbol, and at least one linking reference associated with the second set of displayable data. If desired, a user can select the second set of displayable data. The associated linking reference is sent to a database. The database contains additional information. The associated linking reference is used by the database to search for the additional information, and returns the requested information to the user.

22 Claims, 3 Drawing Sheets

U.S. PATENT DOCUMENTS

| | | | |
|---|---|---|---|
| 4,442,502 A | 4/1984 | Friend et al. | |
| 4,528,643 A | 7/1985 | Freeny, Jr. | |
| 4,556,904 A | 12/1985 | Monat | |
| 4,563,702 A | 1/1986 | Heller et al. | |
| 4,635,113 A | 1/1987 | Okada et al. | |
| 4,694,490 A | 9/1987 | Harvey et al. | |
| 4,734,858 A | 3/1988 | Schlafly | |
| 4,742,544 A | 5/1988 | Kupnicki et al. | |
| 4,768,087 A | 8/1988 | Taub et al. | |
| 4,823,388 A | 4/1989 | Mizutani et al. | |
| 4,827,508 A | 5/1989 | Shear | |
| 4,835,683 A | 5/1989 | Phillips | |
| 4,860,352 A | 8/1989 | Laurance et al. | |
| 4,873,662 A | 10/1989 | Sargent | |
| 4,877,404 A | 10/1989 | Warren et al. | |
| 4,899,292 A | 2/1990 | Montagna et al. | |
| 4,965,825 A | 10/1990 | Harvey | |
| 4,987,595 A | 1/1991 | Marino, Jr. et al. | |
| 5,010,571 A | 4/1991 | Katznelson | |
| 5,029,206 A | 7/1991 | Marino, Jr. et al. | |
| 5,058,000 A | 10/1991 | Cox | |
| 5,081,678 A | 1/1992 | Kaufman et al. | |
| 5,099,516 A | 3/1992 | Durkin et al. | |
| 5,103,476 A | 4/1992 | Waite et al. | |
| 5,124,909 A | 6/1992 | Blakely | |
| 5,128,981 A | 7/1992 | Tsukamoto | |
| 5,132,680 A | 7/1992 | Tezuka et al. | |
| 5,155,847 A | 10/1992 | Kirouac et al. | |
| 5,157,783 A | 10/1992 | Anderson et al. | |
| 5,185,794 A | 2/1993 | Thompson et al. | |
| 5,208,671 A | 5/1993 | Tarrant | |
| 5,208,857 A | 5/1993 | Lebrat | |
| 5,214,697 A | 5/1993 | Saito | |
| 5,222,134 A | 6/1993 | Waite et al. | |
| 5,237,411 A | 8/1993 | Fink et al. | |
| 5,239,540 A | 8/1993 | Rovira et al. | |
| 5,241,671 A | 8/1993 | Reed et al. | |
| 5,247,347 A | 9/1993 | Litteral et al. | |
| 5,247,575 A | 9/1993 | Sprague et al. | |
| 5,265,065 A | 11/1993 | Turtle | |
| 5,267,314 A | 11/1993 | Stambler | |
| 5,282,247 A | 1/1994 | McLean et al. | |
| 5,283,828 A | 2/1994 | Saunders et al. | |
| 5,319,707 A | 6/1994 | Wasilewski et al. | |
| 5,321,748 A | 6/1994 | Zeidler et al. | |
| 5,321,750 A | 6/1994 | Nadan | |
| 5,323,148 A | 6/1994 | Olazabal et al. | |
| 5,327,174 A | 7/1994 | Kim | |
| 5,335,275 A | 8/1994 | Millar et al. | |
| 5,335,278 A | 8/1994 | Matchett et al. | |
| 5,341,429 A | 8/1994 | Stringer et al. | |
| 5,343,494 A | 8/1994 | Averst et al. | |
| 5,361,399 A | 11/1994 | Linquist et al. | |
| 5,365,591 A | 11/1994 | Carswell et al. | |
| 5,377,266 A | 12/1994 | Katta et al. | |
| 5,381,476 A | 1/1995 | Kimoto et al. | |
| 5,383,185 A | 1/1995 | Armbruster et al. | |
| 5,384,835 A | 1/1995 | Wheeler et al. | |
| 5,388,101 A | 2/1995 | Dinkins | |
| 5,392,023 A | 2/1995 | D'Avello et al. | |
| 5,392,353 A | 2/1995 | Morales | |
| 5,394,559 A | 2/1995 | Hemmie et al. | |
| 5,400,403 A | 3/1995 | Fahn et al. | |
| 5,404,505 A | 4/1995 | Levinson | |
| 5,418,948 A | 5/1995 | Turtle | |
| 5,432,798 A | 7/1995 | Blair | |
| 5,444,769 A | 8/1995 | Koen et al. | |
| 5,452,356 A | 9/1995 | Albert | |
| 5,488,725 A | 1/1996 | Turtle | |
| 5,506,984 A | 4/1996 | Miller | |
| 5,509,070 A | 4/1996 | Schull | |
| 5,510,992 A | 4/1996 | Kara | |
| 5,519,866 A | 5/1996 | Lawrence et al. | |
| 5,524,073 A | 6/1996 | Stambler | |
| 5,528,490 A | 6/1996 | Hill | |
| 5,530,740 A | 6/1996 | Irribarren | |
| 5,530,751 A | 6/1996 | Morris | |
| 5,534,857 A | 7/1996 | Laing et al. | |
| 5,539,449 A | 7/1996 | Blahut et al. | |
| 5,543,789 A | 8/1996 | Behr et al. | |
| 5,555,303 A | 9/1996 | Stambler | |
| 5,555,407 A | 9/1996 | Cloutier et al. | |
| 5,559,936 A | 9/1996 | Poulter et al. | |
| 5,563,946 A | 10/1996 | Cooper et al. | |
| 5,592,551 A | 1/1997 | Lett | |
| 5,613,004 A | 3/1997 | Cooperman et al. | |
| 5,625,690 A | 4/1997 | Michel et al. | |
| 5,629,867 A | 5/1997 | Goldman | |
| 5,640,192 A | 6/1997 | Garfinkle | |
| 5,646,998 A | 7/1997 | Stambler | |
| 5,668,592 A | 9/1997 | Spaulding | |
| 5,668,950 A | 9/1997 | Kikuchi et al. | |
| 5,677,953 A | 10/1997 | Dolphin | |
| 5,682,318 A | 10/1997 | Kara | |
| 5,692,073 A | 11/1997 | Cass | |
| 5,694,546 A | 12/1997 | Reisman | |
| 5,697,844 A | 12/1997 | Von Kohorn | |
| 5,721,827 A | 2/1998 | Logan | |
| 5,737,595 A | 4/1998 | Cohen et al. | |
| 5,754,646 A | 5/1998 | Williams et al. | |
| 5,754,864 A | 5/1998 | Hill | |
| 5,757,913 A | 5/1998 | Bellare et al. | |
| 5,761,649 A | 6/1998 | Hill | |
| 5,774,886 A | 6/1998 | Kara | |
| 5,778,076 A | 7/1998 | Kara et al. | |
| 5,784,609 A | 7/1998 | Kurihara | |
| 5,793,302 A | 8/1998 | Stambler | |
| 5,812,929 A | 9/1998 | Tsutsui et al. | |
| 5,818,911 A | 10/1998 | Kawashima | |
| 5,819,034 A | 10/1998 | Kuriacose et al. | |
| 5,870,474 A | 2/1999 | Wasilewski et al. | |
| 5,875,108 A | 2/1999 | Hoffberg et al. | |
| 5,887,065 A | 3/1999 | Audebert | |
| 5,887,243 A | 3/1999 | Harvey | |
| 5,899,998 A | 5/1999 | McGauley et al. | |
| 5,933,604 A | 8/1999 | Inakoshi | |
| 5,936,541 A | 8/1999 | Stambler | |
| 5,954,793 A | 9/1999 | Stutman et al. | |
| 5,961,593 A | 10/1999 | Gabber et al. | |
| 5,968,129 A | 10/1999 | Dillion | |
| 5,970,471 A | 10/1999 | Hill | |
| 5,974,148 A | 10/1999 | Stambler | |
| 5,995,628 A | 11/1999 | Kitaj et al. | |
| 5,995,725 A | 11/1999 | Dillon | |
| 5,999,525 A | 12/1999 | Krishnaswamy et al. | |
| 5,999,934 A | 12/1999 | Cohen et al. | |
| 6,005,938 A | 12/1999 | Banker et al. | |
| 6,021,307 A * | 2/2000 | Chan | 725/110 |
| 6,029,142 A | 2/2000 | Hill | |
| 6,044,365 A | 3/2000 | Cannon et al. | |
| 6,055,314 A | 4/2000 | Spies et al. | |
| 6,076,094 A | 6/2000 | Cohen et al. | |
| 6,078,612 A | 6/2000 | Bertrand et al. | |
| 6,089,453 A | 7/2000 | Kayser | |
| 6,097,816 A | 8/2000 | Momiki et al. | |
| 6,125,388 A | 9/2000 | Reisman | |
| 6,131,088 A | 10/2000 | Hill | |
| 6,188,869 B1 | 2/2001 | Chan | |
| 6,209,142 B1 | 4/2001 | Mattsson | |
| 6,233,568 B1 | 5/2001 | Kara | |
| 6,253,059 B1 * | 6/2001 | Chan | 340/7.21 |
| 6,266,654 B1 | 7/2001 | Schull | |
| 6,289,200 B1 * | 9/2001 | Chan | 455/3.01 |
| 6,314,574 B1 * | 11/2001 | Chan | 725/66 |

| | | | |
|---|---|---|---|
| 6,317,785 B1 * | 11/2001 | Chan | 709/219 |
| 6,339,693 B1 * | 1/2002 | Chan | 455/3.01 |
| 6,343,380 B1 * | 1/2002 | Chan | 725/105 |
| 6,347,215 B1 * | 2/2002 | Chan | 725/99 |
| 6,349,409 B1 * | 2/2002 | Chan | 725/105 |
| 6,397,387 B1 | 5/2002 | Rosin et al. | 725/44 |
| 6,473,860 B1 * | 10/2002 | Chan | 713/193 |
| 6,600,908 B1 * | 7/2003 | Chan | 455/150.1 |
| 6,609,202 B1 * | 8/2003 | Chan | 713/189 |
| 6,665,797 B1 | 12/2003 | Keung | |
| 6,766,140 B1 * | 7/2004 | Chan | 455/3.01 |
| 6,772,344 B1 * | 8/2004 | Chan | 713/193 |
| 6,789,198 B1 * | 9/2004 | Chan | 713/193 |
| 2002/0186887 A1 | 12/2002 | Rhoads | 382/232 |

OTHER PUBLICATIONS

"Microsoft Complete Baseball CD-ROM with Baseball Daily Online to Hit Stores As Microsoft Home's First Complete Sports Software"; Microsoft News Release; Jun. 10, 1994.

Beiser, Karl; "What a difference a year makes: CD-ROM developments"; Online; vol. 17; No. 3; p. 109; May 1993.

Kobielus, James; "Look Before Leaping Into Internet Electronic Commerce"; Network World; p. 32; Feb. 28, 1994.

Louderback, Jim; "One man's mission: a CD ROM Drive in Every PC"; PC Week; vol. 9, No. 22; p. 70; Jun. 1992.

Marshall, Patrick; "Multimedia Software; Microsoft Knows Multimedia and Flaunts it with Encarta CD-ROM"; InfoWorld; p. 113; Apr. 9, 1993.

Newcomb, Steven et al.; "The 'HyTime' Hypermedia/Time-based Document Structuring Language"; Communications of the ACM; vol. 34; No. 11; p. 67; Nov. 1991.

Nicholls, Paul; "Assessing CD-ROM in Canada"; CD-ROM World; vol. 8; No. 5; p. 38; Jun. 1993.

Nickerson, Gordon; "WorldWideWeb"; Computers in Libraries; vol. 12; No. 11; p. 75; Dec. 1992.

Powell, James; Adventures with the World Wide Web: Creating a Hypertext Library Information System; DATABASE; vol. 17; No. 1; p. 59; Feb. 1994.

Quint, Barbara; "compact Cambridge/Cambridge Information Group; Cambridge Scientific Abstracts"; Database Searcher; vol. 8; No. 1; p. 20; Jan. 1992.

Quint, Barbara; "Footsore Searcher Tours Online/CD-ROM '91 Exhibits: 'Day Three'"; Database Searcher; vol. 8; No. 2; p. 10; Feb. 1992.

Rubenstein, Robert et al.; "CD-ROM Update: Tax Information of CD-ROM"; The Tax Adviser; No. 1; vol. 24; p. 59; Jan. 1993).

"Automatic Hypermedia Link Generation"; IBM Technical Disclosure Bulletin; vol. 35; No. 1A; pp. 447-448; Jun. 1992 (JOINT 003687 to 003689).

"CompuServe Incorporated and Metatec Corporation Announce Strategic Alliance"; PR Newswire; Sep. 20, 1993 (JOINT 003789 to 003790).

"CompuServe Releases CD"; Newsbytes; Jun. 3, 1994 (JOINT 009893 to 009894).

"Connect with Nautilus CD"; June. 1994.

"Creating the Hypertext Cluster"; Mar. 21, 2002 (fourteen pages).

"Database Management"; MacUser; vol. 8; No. 13; p. 103; Jan. 1993 (JOINT 003767 to 003772).

"Dialog OnDisc Links: CD-ROM and Online Providing a Complementary Service"; Library Micromation News; No. 24; pp. 11-16; Jun. 1989.

"First International Conference on the World-Wide Web"; May 25-27, 1994 (ten pages).

"FT adds features, loses manager"; Information World Review; No. 84; Sep. 1993 (JOINT 003701 to 003703).

"Fully Digital GML based Authoring and Delivering System for Hypermedia"; IBM Technical Disclosure Bulletin; vol. 35; No. 2; pp. 458-463; Jul. 1992.

"Getting Multimedia From a Kit"; Smart Computing; vol. 4; issue 5; May 1993 (eight pages).

"History of Ovid Technologies"; Feb. 5, 2002 (four pages).

"How money programs compare"; SJM News, p. E4; Oct. 1994 (JOINT 010810).

"Local Area Network Program Distribution Facility"; IBM Technical Disclosure Bulletin; vol. 33; No. 5; pp. 169-171; Oct. 1990 (JOINT 003695 to 003698).

"Microsoft CD-ROM Yearbook: 1989-1990"; Microsoft; pp. 163-170; 1990 (JOINT 5390 to 5400).

"Microsoft Continues Home Momentum With Nine New Products; Showcases New Products and Previews First Online enhancement to CD-ROM Product"; Business Wire; Mar. 1, 1994 (JOINT 003660 to 003664).

"New CompuServe CD-ROM Brings the Power of Multimedia to Online Computing"; PR Newswire; Jun. 1, 1994 (JOINT 009880 to 9884).

"Online banking popular"; Journal American; Jun. 30, 1994 (JOINT 010820).

"Reviews/Products Comparison"; InfoWorld; p. 86; Dec. 7, 1992 (JOINT003704 to 003727).

"S&P And Dialog Introduce Company Information On CD-ROM; Standard & Poor's Corp., CD-ROM Disc"; Information Today; vol. 5; No. 6; p. 22; Jun. 1988 (JOINT 003699 to 003700).

"Web/CD-ROM Hybrids, A Working Definition"; Feb. 1, 2002 (five pages).

Alber, Antone; Videotex/Teletext, Principles and Practices; McGraw-Hill Book Company; ISBN 0-07-000957-0; 1985, no month listed.

Andreessen, Marc; "New X-based Information Systems Browser Available"; Feb. 16, 1993 (two pages).

Andres, Clay; "Authoring Tools Help Developers Deliver Multimedia Message on CD"; Dec. 6, 1993 (four pages).

Bain, G. Donald; "Pinpointing Differences between Atlas Pro, Map Info."; MacWeek, vol. 6; Mar. 9, p. 32; 1992 (JOINT 003651 to 003652).

Baker, Gary; "The Mac Internet Tour Guide"; Jan. 1994 (three pages).

Barr, Christopher; "Buy? Hold? Sell? MarketArts Windows on Wall Street"; *PC Magazine*; vol. 13; No. 11; p. 30; Jun. 14, 1994 (JOINT 003654 to 003655).

Barr, Christopher; "On-line to Tomorrowland"; *PC Magazine*; p. 30; Jan. 25, 1994 (JOINT 003653).

Bermant, Charles; "Enhanced CD's Promise to Redefine 'Liner Notes'"; New York Times; Dec. 11, 1994 (three pages).

Bond, Helen; "Banks hope their customers plug in to on-line bill paying"; The Dallas Morning News; Sep. 18, 1994 (JOINT 010811).

Bower, Gall L.; "CD-Rom, EDI, and POS: Powercom-2000"; CD-ROM Professional; pp. 117-121; Jul./Aug. 1994.

Branstetter, Douglas; Depositon transcript; Aug. 2003.

Brown, C.; "Net 286 Gazette Online Magazine"; No. 1.05; Sep. 25, 1993 (thirty-three pages).

Bryant, Gayle; "Combining Online and Disc"; Online & CD-ROM Review; vol. 17; No. 6; pp. 386-398; Dec. 1993 (JOINT 003656 to 003659).

Burrill, William; "You Can Be the Manager with These Baseball Games"; Toronto Star, sec. LIFE; p. F4; (Earl Weaver Baseball) Aug. 31, 1991 (JOINT 7898 to 7900).

CompuServe CD-ROM documents; 1994 (JOINT 009898 to 009923).

CompuServe documents; Aug. 13, 2002 (JOINT 009887 to 009888).

CompuServe Magazine; Jul. 1994 (JOINT 010743 to 010747).

CompuServe Magazine; May 1994 (JOINT 010748 to 010749).

CompuServe screenshots; Sep. 19, 2003 (JOINT 011139 to 01145).

Deering, S.; "Host Extensions for IP Multicasting"; pp. 1-17; Aug. 1989; Network Working Group; Request for Comments: 1112 (sixteen pages).

Enbysk, Monte; "Banking at home; New software gives access via computer"; Journal American; Feb. 11, 1994; (JOINT 010822 to 010823).

File History of U.S. Patent No. 5, 157,783 to Anderson et al.; issued Oct. 20, 1992 (West) (JOINT 00143 to 00605).

File History of U.S. Patent No. 5,694,546 to Reisman, issued Dec. 2, 1997 (Reisman) (JOINT 00606 to 00882).

Fillmore, Laura; "Internet Publishing: How We Must Think"; Dec. 7, 1993 (seven pages).
Flynn, Laurie; "CD-ROMs: They're Not Just for Entertainment"; New York Times; p. 10; Apr. 24, 1994.
Gautier et al.; "Automatic Program Recording System"; Radiodiff et TV; (w/translation) Nov. 1975 (twenty pages).
Geosel, Jan; The Architecture of Videotex Systems; Prentice-Hall Inc.; ISBN 0130447765; 1983, no month.
Germain, Joseph; "Citations from Engineering Index: EIX"; Jan. 28, 2002 (ten pages).
Griffith, Cary; "The Federal Register on CD-ROM"; Information Today; vol. 9; No. 11; pp. 32-34; Dec. 1992 (JOINT 003682 to 003686).
Hara, Yoshiko; "The Consortium Eyes Satellite-Based E-Book System"; Electronic Engineering Times; Oct. 1998 (two pages).
Jacso, Peter, "Compuserve does CD-ROM; Product Announcement"; Information Today; Oct. 1994 (JOINT 009895 to 009897).
Keizer, Gregg; "Digital Dollars & Silicon Cents"; PC Magazine; pp. 235-244; Jan. 25, 1994 (JOINT 003731 to 003736).
Keizer, Gregg; "MECA's Managing Your Money Breaks Into the Windows Market"; PC Magazine; vol. 13; No. 12; p. 37; Jun. 28, 1994 (JOINT 003728 to 003730).
Keizer, Gregg; "Money Matters; PC Personal-Finance Packages"; Computer Shopper; Aug. 1994; (JOINT 010813 to 010819).
Kristof, Kathy; "Breathing new life into home banking; Computer, TV and phone hookups are new ways of visiting the teller's window"; Chicago Tribune; Jan. 4, 1994 (JOINT 010824).
Liestol, Gunnar; "Hypermedia Communication and Academic Discourse: Some Speculations on a Future Genre"; The Computer Medium; Cambridge Unv. Press; pp. 263-283; 1993, no month used.
Lietzke, Ron; "On-line information Goes Off-Line, Too"; Columbus Dispatch; Jun. 3, 1994 (JOINT 009889 to 009890).
Mainig, Anita; "Customers Build Their Own Mine Vehicles Via Multimedia"; MacWeek; vol. 7; No. 30; p. 42; Jul. 26, 1993 (two pages).
Mann, Richard; "Quicken 3 for Windows; Productivity Choice; Software Review; Evaluation"; Computel; vol. 16; No. 4; p. 76; Apr. 1994 (JOINT 003773 to 003775).
Marcus, John; "Wilson Business Abstracts on CD-Rom for the Corporate Library"; *Database*; vol. 17; No. 3; pp. 52-55; Jun. 1994 (JOINT 003776 to 003780).
Mascha, Michael et al.; "Interactive Education: Transitioning CD-ROMs to the Web"; (Virtual Chimps); May 25-27, 1994.
Mascha, Michael; "Interactive Education: Transitioning CD-ROMs to the Web"; Computer Networks and ISDN Systems; vol. 27; No. 2; pp. 267-272; Nov. 1994.
Mazur et al.; "Joining Digital Hypermedia and Networking for Collaboration In Engineering Design: A Project's Early Consideration"; CD-ROM Professional; pp. 51-54; Mar. 1992.
McManus, Neil; "CD-ROM, online hybrids; compuServe's CompuServe CD"; Aug. 8, 1994 (JOINT 009885 to 009886).
Murray, Rink; "Earl Weaver Baseball II; Software Review; one of four baseball simulation games reviews in '386 Down the Power Alleys"; PC Magazine; vol. 11; No. 8; p. 493; Apr. 26, 1992 (JOINT 7903 to 7904).
Nelson, Nancy; "Connectivity: Let Them Eat Cake"; Information today; vol. 5; Issue 2; Feb. 1988 (five pages).
Nelson, Russell N.; Deposition transcript; Aug. 2003.
Nelson, Theodor Holm; "Literary Machines 90.1"; 1990 (three pages), no month listed.
Nesbit, Kathryn; "BRS/Links to the Future: Online Hypertext is Born"; Online; vol. 14; No. 3; pp. 34-36; May 1990 (five pages).
Nickerson, Gord; "Mining for Gold"; CD-ROM Professional; pp. 128-132; Jan. 1994.
Nielsen, Jakob; "Hypertext and Hypermedia"; 1993 (ten pages), no month listed.
Nunn-Price, Norman; "The Link Between CD-Rom and Online"; Law Technology Journal; vol. 2; No. 2; at 13; (Justis Article); May 1993 (JOINT 7855 to 7857).
O'Connor, Mary Ann; "Markup, SGML, and Hypertext for Full-Text Databases—Part III"; CD-ROM Professional; pp. 130-131; Nov. 1992.
Oben, Alta; "Review of Nautilus from May 1995 Monitor"; Jan. 14, 1994 (four pages).
Ogawa et al.; "Design Strategies for Scenario-based Hypermedia: Description of its Structure, Dynamics and Style"; Proceeding of the ACM Conference on Hypertext; pp. 71-80; Nov. 30-Dec. 4, 1992 (eleven pages).
Backet Driver CD-ROM Documents (JOINT 010302 to 010399), no date listed.
Parkinson, Kirsten L.; "Nautilus CD Adds Magazine-Like Interface; Product Announcement"; MacWeek; vol. 7; No. 41; p. 12; Oct. 18, 1993 (JOINT 003787 to 003788).
Premise Notebook Screen Captures; (JOINT 009719 to 009722), no date listed.
Premise User Manual; 1991; (JOINT 009240 to 009404), no month listed.
Premise User Manual; 1992; (JOINT 009405 to 009464), no month listed.
Premise User Packet; Front and Back Cover; May 5, 1991; (JOINT 009687 to 009688).
Raggett, David; HTML+ (Hypertext Markup Language); pp. 1-31; WWW Discussion Group Request for Comments; Jul. 12, 1993.
Reality's "Wealth Builder 3.0 by Money Magazine"; User's Guide and floppy disks; 1992 (JOINT 7911 to 7913; 7933 (twenty-six pages); 7934 (one hundred, fifty-eight pages); 7935 (User's Guide; three hundred, thirty-seven pages)), no month listed.
Reference Manual Revised Edition; West CD Rom Libraries; 1989; (JOINT 009465 to 9686), no month listed.
Reisman, Richard R.; "CD-ROM/Online Hybrids, The Missing Link:?"; CD-ROM Professional; vol. 8, No. 4; Apr. 1995 (nine pages).
Rescorla, E. et al.; "The Secure HyperText Transfer Protoclo"; Jun. 1994 (twenty-three pages).
Richman, Barry; "Online or Ondisc? When to Choose CD-ROM for your Database"; CD-ROM Professional; pp. 53-54; Mar. 1993.
Rogers, Scot P.; "Citations from Business Dateline Thru 1998: BD1"; Feb. 5, 2002 (thirty-eight pages).
Rogers, Scot P.; "Citations from Inform:Inf"; Feb. 5, 2002 (ten pages).
Rogers, Scot P.; "Citations from Promt-Predicasts:PM3"; Feb. 5, 2002 (four pages).
Salamone, Salvatore; "Electronic software Distribution: Diamond in the Rough"; Data Communications; pp. 109-116; Mar. 1993 (JOINT 003794 to 003799).
Scenarios 1-6 and SAM Screen Captives; (Jul. 1, 1993); (JOINT 9216-9229).
Schneider, Marc; "What is Teletext?"; Philips Semiconductors Video Products; pp. 2-204 to 2-212; Jun. 1994 (nine pages).
Scisco, Peter; "Pigskin preview; computer football games; Software Review; Evaluation"; Computel; vol. 14; No. 6; p. 92; Sep. 1992 (JOINT 7905 to 7910).
Sherman, Christopher V. et al.; "Exploring Hybrid World of CD-ROM/On-Line Products"; Multimedia Week; vol. 3; No. 10; Mar. 7, 1994 (JOINT 7731 to 7738).
Simon, Barry; "Pipeline: Enter the Internet"; PC Magazine; p. 46; Feb. 8, 1994 (JOINT 003811).
Slay, Alan L.; "Money Management Cures"; MacWorld; pp. 152-158; Mar. 1991 (JOINT 003812 to 003818).
Smith Jr., Kime H. et al.; "Accessing Multimedia Network Services"; IEEE Communications Magazine; pp. 72-80; May 1992.
Sofware Dispatch CD and Related Documentation; 1993 (JOINT 009734 to 009737), no month listed.
Stangenes, Sharon; "'First' teams up with Microsoft on home banking"; Chicago Tribune; Nov. 19, 1993 (JOINT 010826).
Steinberg, Jeffrey A.; "GeoQuery"; MacUser, vol. 8; No. 10; p. 58; Oct. 1992 (JOINT 003831 to 003833).
Sugawara, Sandy; "Microsoft's very big ballpark estimate; Software giant's 'complete baseball' opens a window on its ambitious on-line plans"; Washington Post; p. C1; May 7, 1994 (JOINT 003834 to 003836).
Swenson, John; "Banking through home computer has arrived"; Journal American; May 23, 1994 (JOINT 010821).

Swenson, John; "Software you can bank on; Microsoft, U.S. Bank to put financial services within modern's reach"; Journal American; Dec. 7, 1993 (JOINT 010825).

USA Today; "Keyboards Dream Teams"; sec. BONUS; p. 4E; Aug. 30, 1991 (JOINT7896 to 7897).

Vaughn, Mary A. et al.; "Publishing on CD-ROM: The NautilusCD Experience"; CD-ROM Professional; vol. 7; No. 3; pp. 59-68; May/Jun. 1994 (JOINT 003837 to 003843).

Vogt, Sjoerd; "CD-ROM and Online-competitors or Compatriots? An Online Host's Point of View"; Online Information 92; pp. 33-45 (David I. Raitt ed., 16th International Online Information Meeting Proceedings, London, Dec. 8-10, 1992); (Joint 7858 to 7871).

Warner, Jack; "Sports Computer Games; Several new football games out"; The Atlanta Journal and Constitution; p. F2; Nov. 17, 1991 (JOINT 7901 to 7902).

Warner, Paul D.; "Tax Services and Tax Forms on CD-ROM"; CPA Journal; at 48; Nov. 1993 (JOINT 7752 to 7756).

Warner, Paul D.; "A Follow-up On CD-ROM Tax Services (The CPA & the Computer)"; The CPA Journal Online; Jan. 1995 (four pages).

Weinert, Bryan; "CD-ROM Technology, Past, Future"; Jan. 23, 2002 (three pages).

West's CD-Rom Communique Special Issue; Spring 1991 (JOINT 009708 to 009710), no month listed.

Hayes, John P.; "Computer Architecture and Organization"; pp. 398-421; Jan. 1988.

Liu Cricket et al.; "Managing Internet Information Services"; O'Reilly & Associates, Inc; pp. 279-298; Dec. 1994.

David Raggett, WWW Discussion Group Request for Comments, "HTML (Hypertext Markup Language)," Jul. 12, 1993.

John P. Hayes, "Computer Architecture and Organization," Jan. 1998.

Phillips Multimedia, "Exploring Hybrid World of CD-ROM/On-Line Products," Multimedia Week, vol. 3, No. 10, Mar. 7, 1994.

Law Technology Journal, The Link Between CD-Rom and Online, vol. 2, No. 2, May 1993, at 13. (Justis Article).

Sjoerd Vogt, "CD-ROM and Online-Competitors or Compatriots? An Online Host's Point of View," Online Information 92 at 33 (David I. Raitt ed., 16th International Online Information Meeting Proceedings, London, Dec. 8-10, 1992).

Sjoerd Vogt, "CD-ROM and Online-Competitors or Compatriots? An Online Host's Point of View," Online Information 92 at 33 (David I. Raitt ed., 16th International Online Information Meeting Proceedings, London, Dec. 8-10, 1992).

Paul D. Warner, "Tax Services and Tax Forms on CD-ROM," CPA Journal, Nov. 1993, at 48.

G. Donald Bain, "Pinpointing Differences Between Atlas Pro, Map Info.," MacWeek, vol. 6 (Mar. 9, 1992), p. 32.

Christopher Barr, "On-line to Tomorrowland," PC Magazine (Jan. 25, 1994), p. 30.

Christopher Barr, "Buy? Hold? Sell? MarketArts Windows on Wall Street," PC Magazine, vol. 13, No. 11 (Jun. 14, 1994), p. 30.

Gayle Bryant, "Combining Online and Disc," Online & CD-ROM Review, vol. 17, No. 6 (Dec. 1993), pp. 386-398.

"Microsoft Continues Home Momentum With Nine New Products; Showcases New Products and Previews First Online Enhancement to CD-ROM Product," Business Wire (Mar. 1, 1994).

"CD-Rom With Baseball Daily Online To Hit Stores as Microsoft Home's First Complete Sports Software; Comprehensive, Multimedia Guide to America's Favorite Pastime Is an Official Publication of Major League Baseball," Business Wire (Jun. 10, 1994).

Cary Griffith, "The Federal Register on CD-ROM," Information Today, vol. 9, No. 11 (Dec. 1992), pp. 32-34.

"Automatic Hypermedia Link Generation," IBM Technical Disclosure Bulletin, vol. 35, No. 1A (Jun. 1992), pp. 447-448.

"Fully Digital GML based Authoring and Delivering System for Hypermedia," IBM Technical Disclosure Bulletin, vol. 35, No. 2 (Jul. 1992), pp. 458-463.

"Local Area Network Program Distribution Facility," IBM Technical Disclosure Bulletin, vol. 33, No. 5 (Oct. 1990), pp. 169-171.

"S&P And Dialog Introduce Company Information On CD-ROM; Standard & Poor's Corp., CD-ROM Disc," Information Today, vol. 5, No. 6 (Jun. 1988), p. 22.

"FT adds features, loses manager," Information World Review, No. 84 (Sep. 1993).

"Reviews/Products Comparison," InfoWorld (Dec. 7, 1992), p. 86.

Gregg Keizer, "MECA's Managing Your Money Breaks Into the Windows Market," PC Magazine, vol. 13, No. 12 (Jun. 28, 1994), p. 37.

Gregg Keizer, "Digital Dollars & Silicon Cents," PC Magazine (Jan. 25, 1994), pp. 235-244.

Ron Lietzke, "On-line information Goes Off-Line, Too," Columbus Dispatch (Jun. 3, 1994).

"Database Management," MacUser, vol. 8, No. 13 (Jan. 1993), p. 103.

Richard Mann, "Quicken 3 for Windows; Productivity Choice; Software Review; Evaluation," Computel, vol. 16, No. 4 (Apr. 1994), p. 76.

John Marcus, "Wilson Business Abstracts On CD-Rom for the Corporate Library," Database, vol. 17, No. 3 (Jun. 1994), pp. 52-55.

Kirsten L. Parkinson, "Nautilus CD Adds Magazine-Like Interface; Product Announcement," MacWeek, vol. 7, No. 41 (Oct. 18, 1993), p. 12.

"CompuServe Incorporated and Metatec Corporation Announce Strategic Alliance," PR Newswire (Sep. 20, 1993).

"New CompuServe CD-ROM Brings the Power of Multimedia to Online Computing," PR Newswire (Jun. 1, 1994).

Salvatore Salamone, "Electronic software Distribution: Diamond in the Rough," Data Communications (Mar. 1993), pp. 109-116.

Barry Simon, "Pipeline: Enter the Internet," PC Magazine (Feb. 8, 1994), p. 46.

Alan L. Slay, "Money Management Cures," MacWorld (Mar. 1991), pp. 1252-158.

Jeffrey A. Steinberg, "GeoQuery," MacUser, vol. 8, No. 10 (Oct. 1992), p. 58.

Sandy Sugawara, "Microsoft's very big ballpark estimate; Software giant's 'complete baseball' opens a window on its ambitious on-line plans," Washington Post (May 7, 1994).

Mary A. Vaughn and Brad Warnick, "Publishing on CD-ROM: The NautilusCD Experience," CD-ROM Professional, vol. 7, No. 3 (May/Jun. 1994), pp. 69-68.

"Microsoft CD-ROM Yearbook: 1989-1990" Microsoft (1990), pp. 163-170, no month listed.

Reality's "Wealth Builder 3.0 by Money Magazine," User's Guide (1992), no month listed.

Peter Scisco, "Pigskin preview; computer football games; Software Review; Evaluation," Computel, vol. 14, No. 6 (Sep. 1992), p. 92.

Jack Warner, "Sports Computer Games; Several new football games out," The Atlanta Journal and Constitution (Nov. 17, 1991).

Rink Murray, "Earl Weaver Baseball II; Software Review; one of four baseball simulation games reviews in '386 Down the Power Alleys," PC Magazine, vol. 11, No. 8 (Apr. 26, 1992), p. 493.

* cited by examiner

K-S Particle Found

Two physicists announced that they had found the
<u>K-S particle</u>. If confirmed, this will verify the theory
of the Nobel laureates, Professors <u>Kendrick Chan</u>
and <u>Sophia Chan</u>, who first postulated the existence
of the K-S particle ten years ago. The physicists,
Drs. <u>Lisa Smith</u> and <u>John Doe</u>, showed computer
generated results indicating the detection of the K-S
particles in a series of experiments carried out at the
<u>International Super-High Energy Accelerator</u>.

FIG. 2A

K-S Particle Found¶ ¶  Two physicists announced that
they had found the ϒ'K-S particleϒ'⌘FE330AB⌘. If
confirmed, this will verify the theory of the Nobel
laureates, Professors ϒ'Kendrick Chanϒ'⌘A245DC8⌘ and
ϒ'Sophia Chanϒ'⌘85AC258⌘, who first postulated the
existence of the K-S particle ten years ago. The
physicists, Drs. ϒ'Lisa Smithϒ'⌘3098BE6z⌘ and ϒ'John
Doeϒ'⌘EAC7835⌘, showed computer generated results
indicating the detection of the K-S particles in a series
of experiments carried out at the ϒ'International Super-
High Energy Acceleratorϒ'⌘C347A49⌘.¶

FIG. 2B

INFORMATION DISTRIBUTION AND PROCESSING SYSTEM

This application is a continuation of application Ser. No. 10/079,257 filed Feb. 19, 2002, now abandoned, which is a continuation of application Ser. No. 09/699,022 filed Oct. 27, 2000, now abandoned, which is a continuation of Ser. No. 09/480,226 filed Jan. 10, 2000, now U.S. Pat. No. 6,347,215, which is a continuation of Ser. No. 08/939,368 filed Sep. 29, 1997, now U.S. Pat. No. 6,021,307, which is a continuation in part of application Ser. No. 08/644,838 filed May 10, 1996, now abandoned, which is a continuation in part of application Ser. No. 08/279,424 filed Jul. 25, 1994, now abandoned. All these patent applications are incorporated herein by reference.

This invention relates generally to information distribution, and more particularly to distributing information using a broadcast channel and a bi-directional communication channel.

BACKGROUND OF THE INVENTION

Recent advancements in modem and computer technology allow large amount of digital data to be transmitted electronically. A number of information providers (such as newspaper and magazine publishers) and on-line information distributors have formed partnerships to deliver newspaper and other information on-line. In this system, a subscriber uses a computer and a modem to connect, through a regular phone line, to the computer of an on-line information provider. The subscriber can retrieve information, including newspaper articles, stored in the computer of the information provider.

On-line delivery of newspaper has many advantages. For example, the information can be updated throughout the day while the printed version is printed only once or twice a day. Further, it is possible to do text-based searches on the information. However, it is found that on-line deliver of newspaper and other information is slow. For example, a subscriber has to wait many seconds for a newspaper article to be delivered. The quality of the electronic newspaper is low. For example, in order to reduce storage and communication requirements, graphic images appeared in the printed version are not universally supplied in the on-line version of newspaper. One of the reasons for such poor performance is the limited bandwidth of communication channels used by on-line information distributors. Another reason is that information is centrally processed by the computer at the site of the information distributor, with the result that each subscriber only gets a small slice of the time of the computer.

SUMMARY OF THE INVENTION

The present invention uses two channels to deliver digital information: a broadcast channel and a bi-directional channel. The broadcast channel is used to deliver the bulb of the digital information to subscribers. The amount of information delivered is preferably sufficient to satisfy the needs of a large number of subscribers so that they do not have to obtain additional information using the bi-directional channel. The broadcasted information is stored on fast storage media located at subscriber sites. As a result, search and retrieval of the broadcasted information is quick. Further, the broadcasted information is processed locally using a dedicated on-site processor instead of relying on the computers of the information distributors. As a result, the load on the computers of the information distributors is reduced. If the subscribers desire to receive additional information relating to the broadcasted information, the bi-directional communication channel is used to transmit the request and the requested information.

The distribution costs of broadcast channels are typically much lower than that of a bi-directional communication channel. Consequently, the major portion of information is delivered using low cost distribution channels. For a large number of subscribers, the broadcasted information will provide all the information they normally need. Thus, expensive bi-directional communication channels are used only occasionally.

These and other features and advantages of the present invention will be fully understood by referring to the following detailed description in conjunction with the accompanying drawings.

BRIEF DESCRIPTION OF THE DRAWINGS

FIG. 2A shows a newspaper article as displayed on a monitor of the information distribution system shown in FIG. 1.

FIG. 2B shows the contents of the broadcast information which corresponds to the newspaper article of FIG. 2A.

DETAILED DESCRIPTION OF THE INVENTION

Figure 1:
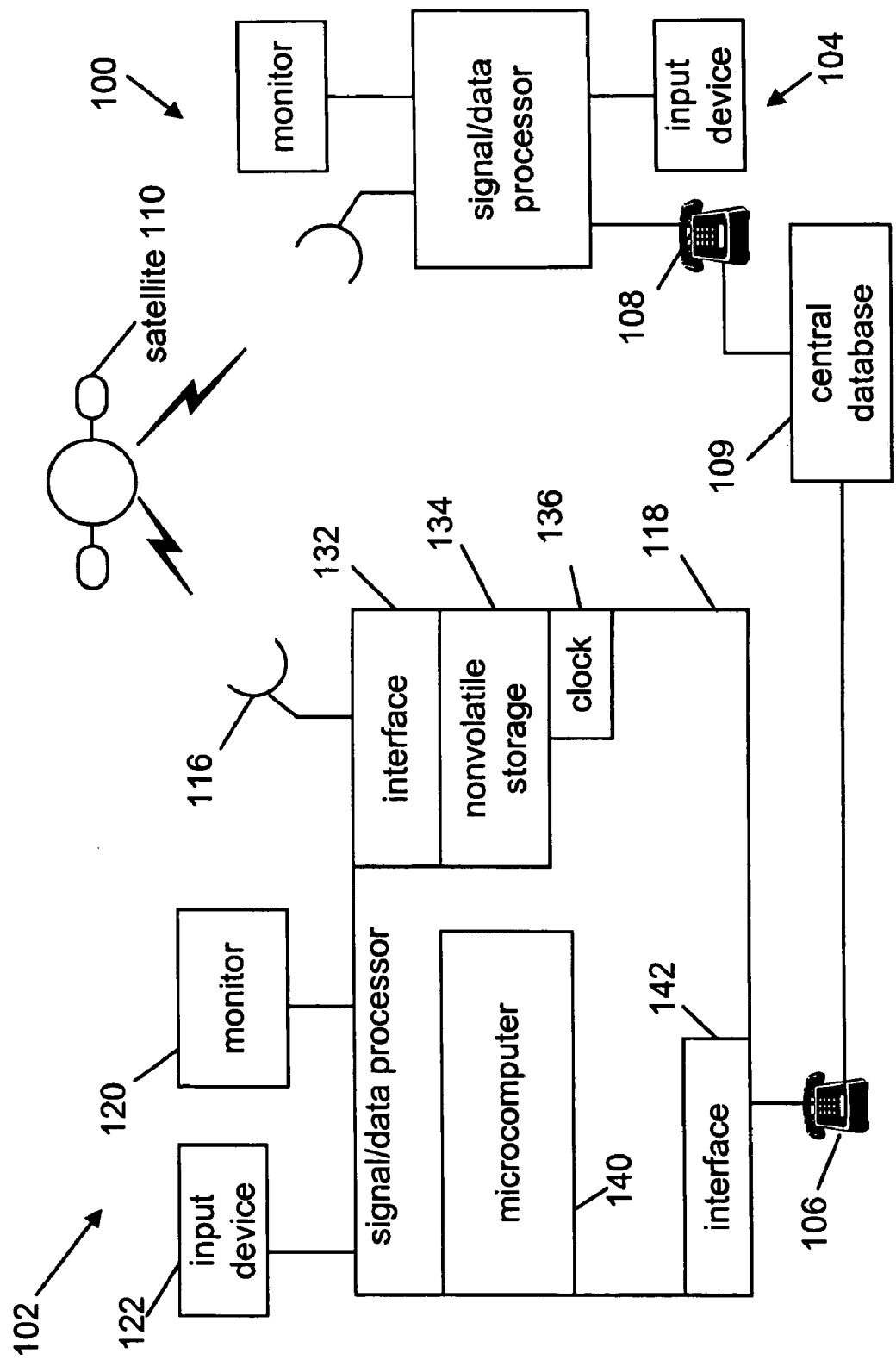
FIG. 1 is a schematic drawing showing an information distribution system of the present invention.

FIG. 1 is a block diagram of an information distribution system 100 in accordance with the present invention. In this embodiment, system 100 is designed to electronically distribute newspaper. It should be pointed out that system 100 can also be used advantageously to distribute other types of information. System 100 contains a plurality of subscriber units (such as units 102 and 104) each connected to a bi-directional communication channel (e.g., telephone connections 106 and 108 coupled to units 102 and 104, respectively) and a satellite transponder 110 for broadcasting digital data to these subscriber units. Telephone connections 106 and 108 (which could be line-based or wireless) are coupled to a central database 109. In system 100, satellite transponder 110 is used to broadcast the content of a newspaper to the subscriber units while telephone connections 106 and 108 are used to provide additional information (stored in central database 109) to subscriber units 102 and 104, respectively, on a demand basis.

The structure of these subscriber units are substantially identical; consequently, only one of these units, such as unit 102, is described in detail. Unit 102 contains an antenna 116 for receiving broadcast signals from satellite transponder 110, a signal/data processor 118 for performing signal and data processing functions, a monitor 120 for displaying the electronic newspaper, and an input device 122 (such as a keyboard and/or a mouse).

Signal/data processor 118 contains a transponder interface 132 for processing transponder signal received from antenna 116. Transponder interface 132 typically contains a low noise receiver for receiving high frequency (e.g., C or Ku band) transponder signal and a "universal data interface" for converting the transponder signal to digital data. The retrieved data is stored in nonvolatile storage 134, such as a hard disk or solid state flash memory. Preferably, satellite transponder 110 broadcasts the newspaper data at predetermined times. Thus, a real-time dock 136 is preferably used to turn on interface 132 at the predetermined times. Processor 118 contains a microcomputer 140 which coordinates the operation of dock 136, nonvolatile storage 134, and interface 132. Processor 118 also contains a communication interface 142 for sending and receiving digital data from central database 109 through telephone connection 106.

The time for broadcast is preferably chosen when communication load of transponder 110 is at a low level (e.g., around mid-night). As a result, the cost of information delivery is low. Alternatively, the time of broadcasting is chosen by transponder 110 because it knows when communication load is light. In this case, transponder 110 first sends a signal to signal/data processor 118 for alerting processor 118 to receive and process the newspaper information.

A user can use the input device 122 and monitor 120 to read the content of the electronic newspaper stored in nonvolatile storage 134. In this embodiment, the complete content of the newspaper is stored in nonvolatile storage 134. The term "complete content" means that the user is able to read the newspaper without relying on information stored in central database 109 (although other embodiments may deliver less than the complete content). In this aspect, system 100 functions in a similar way as the distribution of a conventional printed newspaper. However, the digital data of the electronic newspaper delivered by satellite transponder 110 preferably contains linkage reference which allows fast retrieval of additional information from central database 109.

If the newspaper information received from satellite transponder 110 is sufficient to satisfy the needs of a user, signal/data processor 118 will not activate telephone connection 106. However, if the user wishes to receive additional information relating to an item mentioned in the electronic newspaper (e.g., by selecting at the item using the input device), process 118 will retrieve the information stored in central database 109 using the embedded linkage reference.

In system 100 of the present invention, the complete content of the electronic newspaper (including graphics and other multimedia contents, if delivered) is stored in nonvolatile storage 134, which has fast access time. Further, a dedicated processor (i.e., microcomputer 140) is used to process newspaper information. On the other hand, prior art on-line newspaper distribution systems rely on modem to deliver the content of the newspaper stored in a central site. Further, the processor in the central site has to serve many users in delivering the newspaper. As a result, system 100 has superior performance compared to the prior art on-line newspaper delivery systems.

If it is desirable to limit circulation of the newspaper to a certain class of subscribers only (e.g., paid subscribers), the data transmitted by transponder 110 could be encrypted. As a result, only subscribers who have a decryption key are able to read the newspaper. In the case, microcomputer 140 also performs decryption functions.

FIG. 2A shows an example of a portion of a newspaper article as seen on monitor 120. In FIG. 2A, the terms which a user may obtain additional information are underlined (or highlighted in other ways, such as setting in different colors, depending on the choice of the publishers). If desired, the user may select these terms using a pointing device, such as a mouse, and signal/data processor 118 will obtain the additional information from central database 109.

FIG. 2B shows the same portion in FIG. 2A as transmitted by transponder 110 (for simplicity, the embedded formatting codes, such as center, bold, etc., are not shown). Each of the terms underlined in FIG. 2A are enclosed by a special symbol (e.g., the "Y" symbol) and followed by a linkage reference enclosed by another special symbol (e.g., the "X" symbol). These symbols are invisible to the users and is recognizable only by microcomputer 140.

When an underlined term in FIG. 2A is selected by a user, microcomputer 140 extracts the linkage reference and transmits it to central database 109. The linkage reference allows central database 109 to retrieve the necessary information quickly without doing extensive searches. As a result, the response time of system 100 is fast. The retrieved information can itself contains linkage references and can be searched.

If the speed of searching and retrieving data by central database 109 is fast, it may not be necessary to include linkage reference in the information broadcasted by transponder 110. In this case, the user selects (e.g., using the mouse) words and terms he/she is interested in. Signal/data processor 118 transmits the selected items to central database 109, which searches for matches in its database. Matched information is sent to subscriber unit 102 for processing.

The bi-directional channel also allows updating of the broadcasted information. There is typically a time difference between the broadcast and display of information. New information gathered during this time difference can be stored in central database 109 and later transmitted to signal/data processor 118.

In this embodiment of the present invention, satellite transponder 110 is used as the vehicle to electronically broadcast newspaper. However, other broadcast distribution methods can be used. In the present invention, broadcast is defined as one-to-many distribution of information. The broadcast distribution channels do not have to be electrical. For example, the present invention allows the distribution of CDROMs encoded with digital information to the subscriber sites. In the case of electrical broadcast communication channels, both wired and wireless can be used. Preferably, unidirectional channels are used for broadcast because of their low cost; however, the present invention does not preclude the use of bi-directional communication channels (such as telephone lines) as means for distributing broadcast (i.e., one to many) information.

Current technology allows the size of antenna 116 to be as small as 2 feet. The costs of antenna 116 and transponder interface 132 is already low enough to be within the reach of small business or a typical household. The newspaper publisher has to pay for the use of the transponder. However, the costs is comparable to the printing and distribution costs of printed newspaper. It is anticipated that the costs of the newspaper distribution system in accordance with the present invention will be lowered as the number of subscribers increases.

Figure 3:
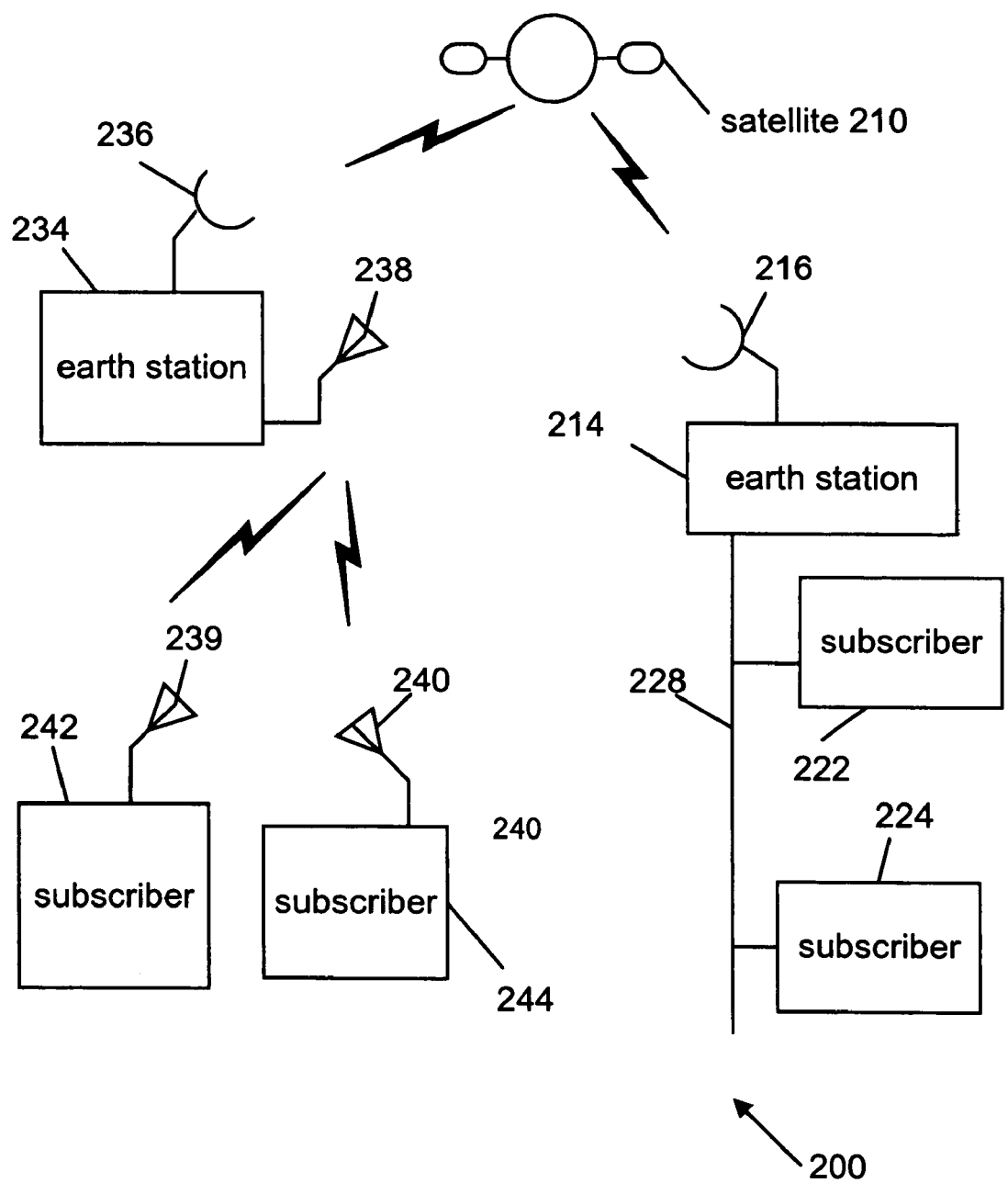
FIG. 3 shows another embodiment of the information distribution system of the present invention.

FIG. 3 shows another embodiment of a newspaper distribution system 200 of the present invention. System 200 contains a satellite transponder 210, an earth station 214, and a plurality of subscriber units, such as units 222 and 224. Transponder 210 functions in a similar way as transponder 110 of FIG. 1 and subscriber units 222 and 224 function in a similar way as subscriber units 102 and 104 of FIG. 1. Earth station 214 receives digital data transmitted by transponder 210 using an antenna 216. The data is distributed to subscriber units 222 and 224 via wired communication channel 228, such as cable and optic fiber. Other earth stations could be placed in strategic locations throughout the country to serve their respective subscribers in a similar manner as earth station 214 and subscriber units 222 and 224. As a result, a large geographic area can be served simultaneously by satellite transponder 210. The advantage of this embodiment is that the equipment costs incurred by the subscriber units are low.

In some locations, it may not be desirable to use wired communication channel to link an earth station to subscribers. In such case, wireless communication channel could be used. FIG. 3 shows an earth station 234 which receives transponder signal from transponder 210 using an antenna 236. Earth station 234 in turn broadcasts the digital data to its subscribers, such as subscriber units 242 and 244.

In one embodiment of system 200, teletext technology is used to link earth station 234 and subscriber units 242 and 244. Thus, earth station 234 could be located adjacent to a television transmission station. The digital data received by earth station 234 can be integrated to the vertical blanking interval of a TV signal, which is broadcasted using an antenna 238. Subscriber units 242 and 244 receive the signal using antennas 239, and 240, respectively. The digital data is then retrieved. Various improvements and refinements of the teletext technology are well known and can be incorporated into system 200.

It should be obvious to a person skilled in the art that systems 100 and 200 are not limited to the distribution of newspaper. Further, electronic newspapers of the future may contains contents which are not available in the printed version, such as video and other multimedia compositions. Other information, such as magazines, graphic images, electronic mails, computer games, multimedia work, or interactive movie, could also be advantageously distribution using a system similar to systems 100 and 200. For example, if it is desirable to distribute interactive movie, the non-interactive portion can be broadcasted while the interactive portion is delivered using a bi-directional channel.

There has thus shown and described a novel information distribution system. Many changes, modifications, variations and other uses and applications of the subject invention will become apparent to those skilled in the art after considering this specification and the accompanying drawings. All such changes, modifications, variations, uses, and applications are covered by the scope of this invention which is limited only by the appended claims.

I claim:

1. An information distribution system for distributing information to users in separate locations, said system being associated with at least one receiving station and a plurality of receiving devices each located in one of said separate locations, each of said receiving devices connecting to a display device that can display said information, said system comprising:

a remote site containing a first set of digital data; and a sender sending, at a time determined by said sender, a second set of digital data to said at least one receiving station for transmission to at least one of said plurality of receiving devices, said second set of digital data comprising a first set of displayable data, a second set of displayable data, another set of data designating a presence of said second set of displayable data, and a first linkage reference associated with said second set of displayable data and with said first set of digital data;

wherein said at least one of said receiving devices causes said display device to display said first set of displayable data in a first way and said second set of displayable data in a second way, extracts at least a portion of said first linkage reference in response to a selection of said second set of displayable data by a user, and sends said at least a portion of said first linkage reference to said remote site.

2. The system of claim 1 wherein said second set of digital data comprises video data.

3. The system of claim 1 wherein said second set of digital data comprises a game.

4. The system of claim 1 wherein said second set of digital data comprises electronic mail.

5. The system of claim 1 wherein said second set of digital data comprises additional set of data for indicating a presence of said first linkage reference.

6. The system of claim 5 wherein said second set of digital data comprises at least one formatting code.

7. The system of claim 1 wherein said sender comprises a transmitter transmitting said second set of digital data using radio frequency signals.

8. The system of claim 7 wherein said radio frequency signals are television frequency signals.

9. The system of claim 1 wherein said sender sends an alert signal prior to sending said second set of digital data.

10. The system of claim 9 wherein said second set of digital data comprises video data.

11. The system of claim 9 wherein said second set of digital data comprises a game.

12. The system of claim 9 wherein said second set of digital data comprises electronic mail.

13. The system of claim 9 wherein said second set of digital data comprises additional set of data for indicating a presence of said first linkage reference.

14. The system of claim 9 wherein said sender comprises a transmitter transmitting said second set of digital data using radio frequency signals.

15. The system of claim 4 wherein said radio frequency signals are television frequency signals.

16. The system of claim 1 wherein said remote site contains a third set of digital data, wherein said first set of digital data comprises a second linkage reference associated with said third set of digital data.

17. The system of claim 16 wherein said second set of digital data comprises video data.

18. The system of claim 16 wherein said second set of digital data comprises a game.

19. The system of claim 16 wherein said second set of digital data comprises electronic mail.

20. The system of claim 16 wherein said second set of digital data comprises additional set of data for indicating a presence of said first linkage reference.

21. The system of claim 16 wherein said sender sends said second set of digital data using radio frequency signals.

22. The system of claim 21 wherein said radio frequency signals are television frequency signals.

* * * * *

UNITED STATES PATENT AND TRADEMARK OFFICE
CERTIFICATE OF CORRECTION

PATENT NO. : 7,181,758 B1
APPLICATION NO. : 10/322624
DATED : February 20, 2007
INVENTOR(S) : Hark C. Chan It is certified that error appears in the above-identified patent and that said Letters Patent is hereby corrected as shown below:

Title Page 2, Item -56-
Change "6,209,142 B1 4/2001 Mattsson" to --6,029,142 B1 2/2000 Hill--.

Title Page 3, Item -56-
Change "Depositon" to --Deposition--.

Title Page 4, Item -56-
Change "Geosel" to --Gecsel--.

Title Page 4, Item -56-
Change "Backet" to --Packet--;
Change "Protoclo" to --Protocol--; and
Change "Sofware" to --Software--.

Title Page 5, Item -56-
Change "modern's" to --modem's--; and
Change "Momenturn" to --Momentum--.

Column 6, Line 39:
Change "claim 4" with --claim 14--.

Signed and Sealed this

Twenty-sixth Day of June, 2007

JON W. DUDAS
*Director of the United States Patent and Trademark Office*